(12) United States Patent
Cox

(10) Patent No.: US 11,254,477 B2
(45) Date of Patent: Feb. 22, 2022

(54) EXTRACTION PRESSURE VESSEL, METHOD OF MANUFACTURE, METHOD OF USE

(71) Applicant: Morgan Specialty Services, Inc., Houston, TX (US)

(72) Inventor: Camaron Cox, Houston, TX (US)

(73) Assignee: Morgan Specialty Services, Inc., Houston, TX (US)

( * ) Notice: Subject to any disclaimer, the term of this patent is extended or adjusted under 35 U.S.C. 154(b) by 17 days.

(21) Appl. No.: 16/732,688

(22) Filed: Jan. 2, 2020

(65) Prior Publication Data

US 2021/0114785 A1 Apr. 22, 2021

Related U.S. Application Data

(60) Provisional application No. 62/916,164, filed on Oct. 16, 2019.

(51) Int. Cl.

| | |
|---|---|
| *B01D 11/00* | (2006.01) |
| *B01D 11/02* | (2006.01) |
| *B01J 19/00* | (2006.01) |
| *B01J 19/18* | (2006.01) |
| *B01J 19/24* | (2006.01) |
| *B65D 51/00* | (2006.01) |
| *B65D 51/18* | (2006.01) |

(Continued)

(52) U.S. Cl.
CPC .......... *B65D 51/18* (2013.01); *B01D 11/0203* (2013.01); *B65D 39/08* (2013.01); *B65D 53/02* (2013.01); *B65D 81/2053* (2013.01); *B01J 19/0073* (2013.01); *B01J 19/2415* (2013.01); *B23K 9/0026* (2013.01); *G05B 19/18* (2013.01); *G05B 2219/30* (2013.01)

(58) Field of Classification Search
CPC ..... B01D 11/00; B01D 11/02; B01D 11/0203; B01J 19/00; B01J 19/0053; B01J 19/0073; B01J 19/24; B01J 19/2415; B01J 2219/00; B01J 2219/24; B23K 9/00; B23K 9/0026; B23K 9/007; B23K 9/02; B23K 9/028; B23K 9/0282; B23K 9/16; B23K 9/167; B23K 9/173; B23K 9/23; B23K 2101/00; B23K 2101/04; B23K 2101/12; B23K 2103/00; B23K 2103/02; B23K 2103/04; B23K 2103/05; B65D 39/00; B65D 39/08; B65D 51/00; B65D 51/18; B65D 53/00; B65D 53/02; B65D 81/00; B65D 81/18; B65D 81/20; B65D 81/2046; B65D 81/2053; G05B 19/00; G05B 19/02; G05B 19/18; G05B 2219/00; G05B 2219/30
See application file for complete search history.

(56) References Cited

U.S. PATENT DOCUMENTS

| | | | | |
|---|---|---|---|---|
| 4,443,321 | A * | 4/1984 | Compton | B01D 11/0203 208/435 |
| 4,649,117 | A * | 3/1987 | Familletti | C12M 29/08 435/296.1 |
| 7,527,068 | B2 * | 5/2009 | Jansen | F16K 49/005 137/340 |

* cited by examiner

*Primary Examiner* — Natasha E Young
(74) *Attorney, Agent, or Firm* — Catherine L. Rifai

(57) ABSTRACT

Devices and methods to extract a desired product from organic matter using supercritical fluid extraction processes are described herein. The extraction vessel generally includes a reaction chamber, a water jacket affixed to the reaction chamber capable of separate pressurization, and a closure mechanism with a gasket, a plug, and a cap ring with ACME threading. The extraction vessel may be sealed by hand closure without a need for additional tools to create a seal able to withstand pressures up to 5,000 psi.

13 Claims, 3 Drawing Sheets

(51) Int. Cl.
*B65D 39/00* (2006.01)
*B65D 39/08* (2006.01)
*B65D 53/00* (2006.01)
*B65D 53/02* (2006.01)
*B65D 81/00* (2006.01)
*B65D 81/18* (2006.01)
*B65D 81/20* (2006.01)
*B23K 9/00* (2006.01)
*G05B 19/18* (2006.01)

EXTRACTION PRESSURE VESSEL, METHOD OF MANUFACTURE, METHOD OF USE

CROSS-REFERENCE TO RELATED APPLICATIONS

This application claims the benefit of U.S. Provisional Patent Application No. 62/916,164, filed Oct. 16, 2019, which is incorporated herein by reference in its entirety.

FIELD

This application relates to an extraction vessel, specifically a vessel for supercritical fluid extraction.

BACKGROUND

Supercritical fluid extraction separates an extractant from a matrix using a hyper supercritical fluid as a solvent. Most commonly, this supercritical fluid solvent is carbon dioxide. However, other solvents, such as water or carbon dioxide may be modified by co-solvents, for example ethanol or methanol, are possible depending on the desired process or product.

Hyper Supercritical carbon dioxide extraction involves pressurizing carbon dioxide to a supercritical state, meaning the carbon dioxide is maintained at or above its critical temperature and pressure and becomes liquid while remaining in a gaseous state. Typical extraction conditions require maintaining carbon dioxide above 31 degrees Celsius and a pressure above 1000 psi. However, the temperature and pressure of supercritical fluid during extraction may also be altered depending on the desired product and the matrix upon which the process is being run.

Hyper Supercritical fluid extraction has several uses including preparing samples for analytical purposes, stripping unwanted materials from a product, or collecting a desired product. This environmentally friendly extraction process is essential to many industries, including food, cosmetics, pharmaceuticals, materials, chemistry, energy, and waste treatment. When used on organic matter, such as plants, the resulting extractant is fresher, cleaner, and crisper than a product achieved by other means, such as steam distillation. The final product is also closer in chemical composition to the original organic matter from which it was derived. Other isolation methods typically must utilize more heat and could result in denaturing the organic matter, thus making a final product much different than the organic matter's natural state.

To extract oils from organic matter, supercritical carbon dioxide is pumped into a chamber filled with the starting organic matter. The carbon dioxide acts as a solvent on the organic material and pulls the oils, pigments, and resin from the organic material. Specifically, the near-liquid density of supercritical fluid increases the interactions between the substrate and the carbon dioxide, and the gas-like properties of the supercritical carbon dioxide allow for mass transfer capabilities. The oil content can then dissolve into the liquid carbon dioxide. Next, the carbon dioxide is brought back to a lower pressure and evaporates into a gaseous state, leaving an extracted oil product.

Altering the temperature and pressure variables of extractions can be done to either optimize the amount of material extracted or to select a desired extractant. For example, subcritical carbon dioxide extraction occurs at a lower pressure and lower temperature than supercritical carbon dioxide extraction. In general, subcritical carbon dioxide is a longer process and results in a lower yield, but it can be beneficial and necessary to preserve substances that supercritical carbon dioxide extraction may destroy. In some instances, a subcritical run may be followed by a supercritical run to completely scrub the matrix of all valuable compounds and achieve a full-spectrum extraction.

Given the vast benefits of supercritical fluid extraction, there is a high demand for safe and efficient methods to scale the production in certain industries. However, supercritical fluid extraction require a high pressure environment, and the vessels in which these reactions occur must be capable of supporting these intense pressures safely.

For users, high-pressure vessels can be dangerous if not properly inspected and operated. The maintenance and training required for high-pressure vessels previously meant higher labor costs, higher inspection costs, and increased liability and risks to users. There is extensive training required to operate the equipment for carbon dioxide extraction. Special tools have typically been required to create the necessary seal on these vessels to withstand the high pressures and avoid issues such as galling or end caps blowing off of the vessel.

For manufacturers of these high-pressure vessels, there have been additional challenges when trying to scale manufacturing processes to meet growing demands from users. Users have demanded larger vessels with higher capacities in order to yield more product from a single supercritical fluid extraction run time within the vessel. However, manufacturing these larger vessels has previously been hindered by practical concerns, such as high manufacturing costs, challenges with shipping such large and heavy vessels to customers after completion of the vessel, and designing a vessel that not only complies with but also exceeds industry safety standards. Prior vessel designs for the reaction chamber have necessitated using multiple welds. A reaction chamber with too many welds can degrade the integrity of a high-pressure vessel in general and add more costs to manufacturers for the required time and labor needed.

Given the above, a need exists for a user-friendly extraction pressure vessel capable of larger capacities to yield more product that can also be manufactured and operated in a safe and cost-efficient manner.

SUMMARY

Devices and methods to extract a desired product from organic matter using hyper supercritical fluid extraction processes are described herein. Embodiments generally include an extraction vessel with a reaction chamber with external threading on at least one end and at least one end having at least one inset groove; a water jacket affixed to the reaction chamber capable of separate pressurization and temperature maintenance; and, at least one closure mechanism on at least one end of the reaction chamber, the closure mechanism comprising a gasket, a plug with at least one port, and a cap ring with internal threading.

One or more embodiments include the extraction vessel of the preceding paragraph wherein the internal and external threading is ACME threading.

One or more embodiments include the extraction vessel of any preceding paragraph of this section wherein the closure mechanism may be sealed by hand closure.

One or more embodiments include the extraction vessel of any preceding paragraph of this section wherein the closure mechanism, external threading, and inset grooves are present on both ends of the reaction chamber.

One or more embodiment include the extraction vessel of any preceding paragraph of this section wherein a sampling mechanism may be affixed to an end of the vessel to allow sampling of a desired product during an extraction run time.

One or more embodiments include the extraction vessel of any preceding paragraph of this section wherein the sampling mechanism comprises a threaded ball valve and fluid hose.

One or more embodiments include the extraction vessel of any preceding paragraph of this section wherein the ports include a mesh filter overlay.

Methods of extracting compounds from organic matter generally include inserting a desired amount of organic matter into a reaction chamber of an extraction vessel with two ends, the ends having ACME threading and an inset groove; sealing the extraction vessel by disposing a gasket within the inset grooves, disposing a plug atop the gasket on both ends, and tightening a cap ring along complementary ACME threading by hand closure; pressurizing a solvent to a supercritical state; pressurizing a water jacket at a lower temperature than the reaction chamber of the extraction vessel; introducing liquid into the water jacket at a lower temperature than the reaction chamber of the extraction vessel, the water jacket having an inlet and an outlet for continuous flow and temperature maintenance; passing the solvent through the organic matter for a preferred run time to promote separation of a desired product from the organic matter; expelling any remaining solvent from the reaction chamber; opening the extraction vessel by removing the cap ring, plug, and gasket; and plunging the desired product from the reaction chamber.

One or more embodiments include the method of the preceding paragraph wherein a user may affix a sampling mechanism to the closure mechanism to allow removal of a sample of the desired product during the run time.

One or more embodiments include the method of any preceding paragraph of this section wherein the sampling mechanism comprises a threaded ball valve and fluid hose.

One or more embodiments include the method of any preceding paragraph of this section wherein the solvent is carbon dioxide.

Methods of manufacturing a high-pressure extraction vessel generally include providing two round bars; machining each round bar to achieve an end with external ACME threads and an inset groove and a hollow core within the round bar with a desired diameter; beveling the machined round bars at a connection point; welding together the round bars at a connection point to form a reaction chamber; welding a water jacket to an outside surface of the reaction chamber to achieve a desired jacket core diameter, the water jacket comprising a hollow sheath with an inlet and an outlet to allow for liquid to flow through; providing a top and a bottom plug, the plugs machined from solid stainless steel bars; and providing a top and bottom cap ring, the cap rings machined from solid carbon steel bars.

One or more embodiments include the method of the preceding paragraph wherein the round bars are of stainless steel.

One or more embodiments include the method of any preceding paragraph of this section wherein the machining is accomplished using computer numerical control technology with multi axis lathe.

One or more embodiments include the method of any preceding paragraph of this section wherein the welding is completed using gas tungsten arc welding.

DETAILED DESCRIPTION

Figure 1:
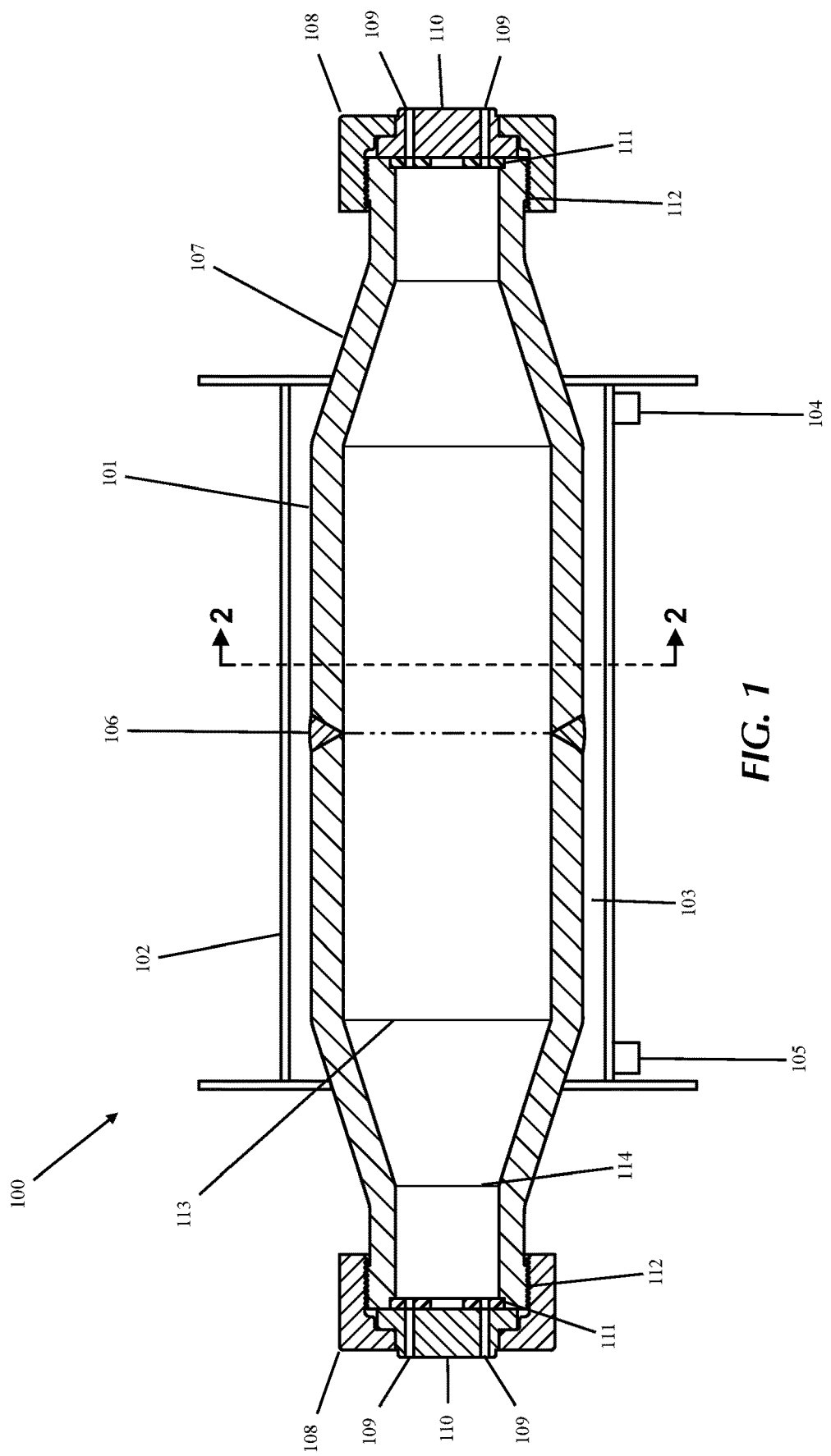
FIG. 1 illustrates an orthogonal sectional view of the extraction vessel with the cap ring engaged with the external threading of the reaction chamber.

A detailed description will now be provided. Each of the appended claims defines a separate invention, which for infringement purposes is recognized as including equivalents to the various elements or limitations specified in the claims. Depending on the context, all references below to the "disclosure" may in some cases refer to certain specific embodiments only. In other cases it will be recognized that references to the "disclosure" will refer to subject matter recited in one or more, but not necessarily all, of the claims. Each of the disclosures will now be described in greater detail below, including specific embodiments, versions and examples, but the disclosures are not limited to these embodiments, versions or examples, which are included to enable a person having ordinary skill in the art to make and use the disclosure when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing.

Further, various ranges and/or numerical limitations may be expressly stated below. It should be recognized that unless stated otherwise, it is intended that endpoints are to be interchangeable. Any ranges include iterative ranges of like magnitude falling within the expressly stated ranges or limitations.

The term "ACME threads" or "ACME threading" should be understood by those of ordinary skill in the art to include a trapezoidal thread form with a 29° thread angle with a thread height half the pitch and a substantially flat apex and valley.

The term "hand closure" should be understood by those of ordinary skill in the art to include the action of screwing a cap ring along threads to a desired tightness without the need for additional tools.

The term "organic matter" should be understood by those of ordinary skill in the art to include any material capable of having constituents removed through carbon dioxide extraction. This can include but is not limited to plant matter, botanical matter, leaves, stems, seeds, herbs, and flowers.

The terms "hyper supercritical fluid" and "solvent" should be understood by those of ordinary skill in the art to include any solvent or combination of solvents that may be brought to a hyper supercritical state and utilized to yield a desired product in a pressure vessel using the described vessel and methods. This can include, but is not limited to, carbon dioxide, water, methane, ethane, propane, ethylene, propylene, methanol, ethanol, acetone, nitrous oxide, carbon dioxide modified by co-solvents, or a combination of these solvents.

Devices and methods to extract a desired product from organic matter using hyper supercritical fluid extraction processes are described herein. The extraction vessels generally include a reaction chamber, a water jacket, and at least one closure mechanism.

The reaction chamber includes a hollow center in which organic matter may be inserted. The hollow center may have varying capacities, depending on the organic matter to be inserted and the desired yield.

The reaction chamber allows for hyper supercritical fluid extraction to occur by a solvent brought to a supercritical state, such as hyper supercritical carbon dioxide, being fed through and interacting with organic matter, with a desired product being extracted from the original organic matter and plunged out of the vessel after a run time. The extraction vessel may be run at a pressure up to 5,000 psi.

The reaction chamber includes two ends, each with external threading and an internal groove adapted to receive a gasket. The threading can be unified threads, metric threads, square threads, ACME threads, or buttress threads. Complementary threading is on the cap ring of the closure mechanism. The cap ring is used to close the ends of the reaction chamber by being screwed onto the external threading on the reaction chamber by hand closure.

The reaction chamber can have a capacity of about 5 L to about 100 L. For vessels of larger capacity, the ends of the reaction chamber may be tapered to reduce overall vessel weight and make transporting the vessel less strenuous. The reaction chamber can be made of a material such as steel, carbon steel, stainless steel, mild steel, Hastelloy, nickel alloy, aluminum, titanium, another metal or a non-metal, for example polymers, to fit the needs of a particular user.

The water jacket generally is welded to and surrounds a portion of the reaction chamber and includes a hollow sheath and an inlet and outlet. The water jacket may be pressurized at different parameters than the reaction chamber and maintained at a separate temperature to maintain ideal reaction conditions within the reaction chamber during the supercritical fluid extraction process.

Generally, the water jacket contains liquid during run time that is maintained at a lower desired temperature to act as a cooling agent for the reaction chamber during an extraction run time. The inlet allows cold liquid to enter from an external source, and the outlet allows warm liquid to exit so that a continuous and controlled temperature may be maintained. The liquid can be water, or it can be a mixture of water with another liquid agent, coolant, or chemicals to fit the needs of a particular user. This lower temperature liquid can be maintained from about 32 degrees Fahrenheit to about 45 degrees Fahrenheit, or from about 35 degrees Fahrenheit to about 55 degrees Fahrenheit. The water jacket may be run from about 30 psi to about 55 psi, depending on the parameters within the reaction chamber during run time.

The water jacket can be made of a material such as steel, carbon steel, stainless steel, mild steel, Hastelloy, nickel alloy, aluminum, titanium, another metal or a non-metal, for example polymers, to fit the needs of a particular user. It is not necessary that the water jacket and the reaction chamber be of the same material. For example, the water jacket could be made of a heavier material than the water jacket.

The closure mechanism generally includes a gasket, a plug, and a cap ring. These closure mechanisms can be of a uniform size to fit vessels of varying capacities. The closure mechanism works in conjunction with the end of the reaction chamber to create the necessary seal on the extraction vessel to carry out hyper supercritical fluid extraction. With these components, the extraction vessel may be sealed by hand closure. If the entire closure mechanism is tightened too tightly or the gasket is loose or wearing out, a tool may be used to open and close the extraction vessel safely. As the extraction vessel is utilized by a user and the parts become warn, replacement parts may be needed to ensure the extraction vessel still runs safely and may be sealed safely by hand closure.

The gasket generally has punched holes and is designed to fit within the inset groove of the reaction chamber to prevent galling or the end caps blowing off during the extreme pressure and reaction parameters occurring within the reaction chamber during an extraction run time.

The plug of the closure mechanism has at least one port to allow for the reaction within the reaction chamber to occur, for example the inlet or outlet of solvent and product. The ports generally have a mesh filter to block unwanted particulates from exiting or entering the chamber, although certain embodiments may exclude the mesh filter if desired or unneeded. The plug and its ports may be customized for different organic matter and reaction parameters. The number of ports on the top and bottom of the extraction vessel will depend on the number of attachments, such as solvent inlets and outlets and sampling mechanisms, that are to be attached. In at least one embodiment, the top plug has three ports and the bottom plug has one port. The plug is designed to sit atop the gasket and inset groove on the end of the reaction chamber.

The cap ring has internal threading which, as described above, is complementary to the external threading on the reaction vessel end. The cap ring is designed to enclose the end of the reaction chamber and other parts of the closure mechanism to create a seal on the vessel capable of withstanding the high pressures occurring within the reaction chamber during an extraction run time.

The closure mechanism parts can made of a material such as steel, carbon steel, stainless steel, mild steel, Hastelloy, nickel alloy, aluminum, titanium, or a metal alloy to fit the needs of a particular user.

In certain embodiments, a sampling mechanism may be affixed to the bottom of the extraction vessel to allow for sampling of the desired product during the extraction process. This sampling mechanism can be a threaded ball valve attached to a fluid hose, or it can be stainless steel tubing or copper pipe. The ball valve screws on to a bottom plug connection. The valve may then be opened to check the product during an extraction run time by emptying a portion of the product into a sample cup. The sample may then be tested to determine if it meets run time specifications and is ready to be plunged from the reaction chamber.

To extract a desired product from organic matter, a user generally inserts a desired amount of organic matter into a reaction chamber of an extraction vessel. The extraction vessel is then closed by placing the gasket within the inset groove on both ends of the vessel, placing the plug atop the inset groove and gasket, and then screwing the cap ring in place along the complementary external threading on the reaction chamber by hand closure. A solvent, such as carbon dioxide, is then pumped into the reaction chamber through one of the ports in the plug and brought to a supercritical state. This hyper supercritical solvent then interacts with the organic matter during an extraction run time to pull a desired product from the organic matter.

During the extraction run time, a liquid, for example water, is introduced into a water jacket that surrounds the reaction chamber through an inlet. Warmer liquid can leave the water jacket through an outlet to ensure continuous flow and temperature maintenance within the water jacket. The liquid is generally maintained at a lower temperature and pressure than the reaction chamber to maintain ideal temperature and reaction conditions within the reaction chamber.

Once an extraction run time is complete and a desired product is achieved, which may be tested through a sampling mechanism, the remaining solvent can be expelled from the reaction chamber through a port in a plug. The vessel may then be opened by unscrewing the cap ring and removing the plug and gasket from the bottom of the extraction vessel. The desired product may then be plunged from the reaction chamber.

To manufacture the extraction pressure vessel, generally a round bar is machined to create a hollow center or core, external threading on one end of the round bar, and an inset groove within that same end of the round bar. The same is done to a second round bar. The two machined round bars are then beveled on the opposite end from the threading and inset groove in preparation for welding. A single weld is then done to join the two round bars and create the reaction chamber of the extraction vessel. This single weld helps to cut down on labor costs and time on the vessel and increase the safety and durability of the overall vessel. The single weld can also be tested using x-ray nondestructive testing methods for various certification and compliance requirements, such as ASME Section VIII, Div. 1 & Div. 2 pressure vessel requirements.

The machining of the round bars can be accomplished using a variety of machining techniques, for example, subtractive manufacturing, turning, milling, drilling, shaping, burnishing, computer numerical control (CNC) machining, precision CNC machining, electrical discharge machining (EDM), electrochemical erosion, laser cutting, water jet cutting, or a combination of these techniques depending on the particular user's needs. In a preferred embodiment, CNC machining is utilized with multi axis lathe.

Once the reaction chamber is formed, a water jacket is welded to an exterior surface of the reaction chamber, for example the middle cylindrical portion of the reaction chamber. The water jacket is designed so as to have a desired jacket core diameter. This water jacket can have a hollow sheath with an inlet and an outlet that allows liquid to flow into and out of the water jacket, yet never allow the liquid to interact with the internal reaction materials within the reaction chamber.

The welds can be done with a variety of techniques, including gas metal arc welding, gas tungsten arc welding (GTAW), tungsten inert gas (TIG) welding, resistance welding (RW), spot welding, metal inert gas (MIG) welding, metal active gas welding, or a combination of these techniques.

The closure mechanisms, specifically the top and bottom plugs and the top and bottom cap rings, are machined from metal components as well. For example, in one embodiment the plugs are machined from one or more solid stainless steel bars, and the top and bottom cap rings are machined from one or more carbon steel bars.

Figure 2:
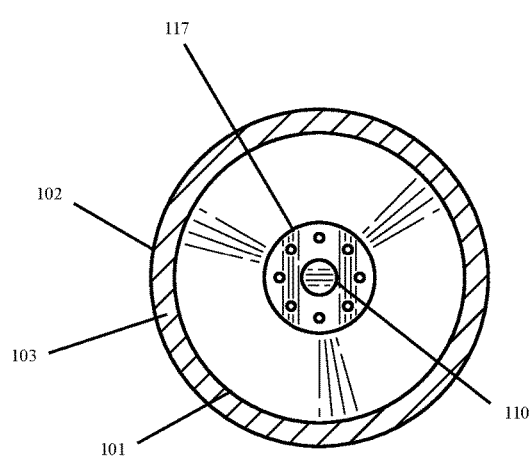
FIG. 2 illustrates a cross-sectional view of the vessel from the approximate center of the vessel.
Figure 3:
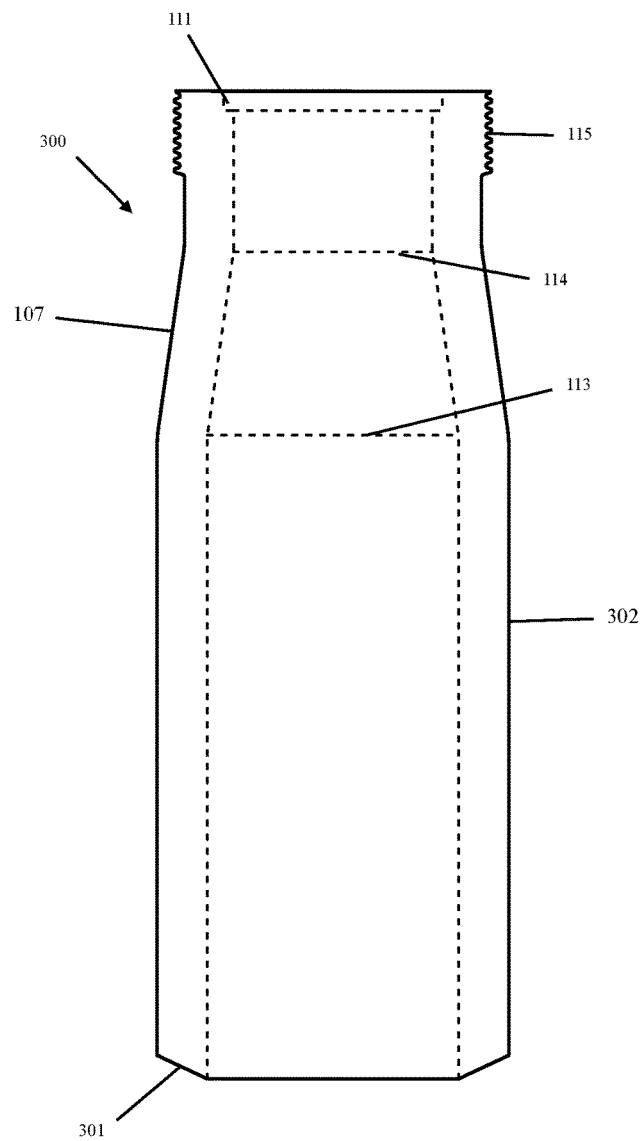
FIG. 3 illustrates an orthogonal sectional view of a machined round bar prior to being welded with another machined round bar to form the reaction chamber of the extraction vessel.

Illustrations of various embodiments of this disclosure are provided within FIGS. 1 through 3. FIG. 1 illustrates an orthogonal sectional view of the extraction vessel 100 with the cap ring 108 engaged with the external threading of the reaction chamber 101. The extraction vessel 100 includes a reaction chamber 101 surrounded by a water jacket 102. The reaction chamber 101 has a hollow cylindrical center with a desired diameter 113. In a preferred embodiment, larger extraction vessels 100 such as this one have an optional tapered end 107 with a separate tapered end diameter 114. In this embodiment, the reaction chamber 101 is formed by a single weld 106 connecting two identical halves of the reaction chamber 101.

The water jacket 102 is welded to the reaction chamber 101. The water jacket 102 has a jacket core 103 in which liquid may enter and leave the water jacket through an inlet 104 and outlet 105. The relative positioning of the inlet 104 and outlet 105 is customizable depending on the needs of a user.

The ends of the reaction vessel are identical in this embodiment, with the engaged internal and external threading 112 of the cap ring 108 and the end of the reaction chamber being displayed. In the engaged position, the gasket (not clearly shown) is placed within an inset groove 111, a plug 110 with one or more ports 109 is placed atop the gasket (not clearly shown) and inset groove 111, and a cap ring 108 covers the plug 110 and end of the reaction chamber to create a closed environment within the reaction chamber 101 in which hyper supercritical fluid extraction may take place.

Figure 1A:
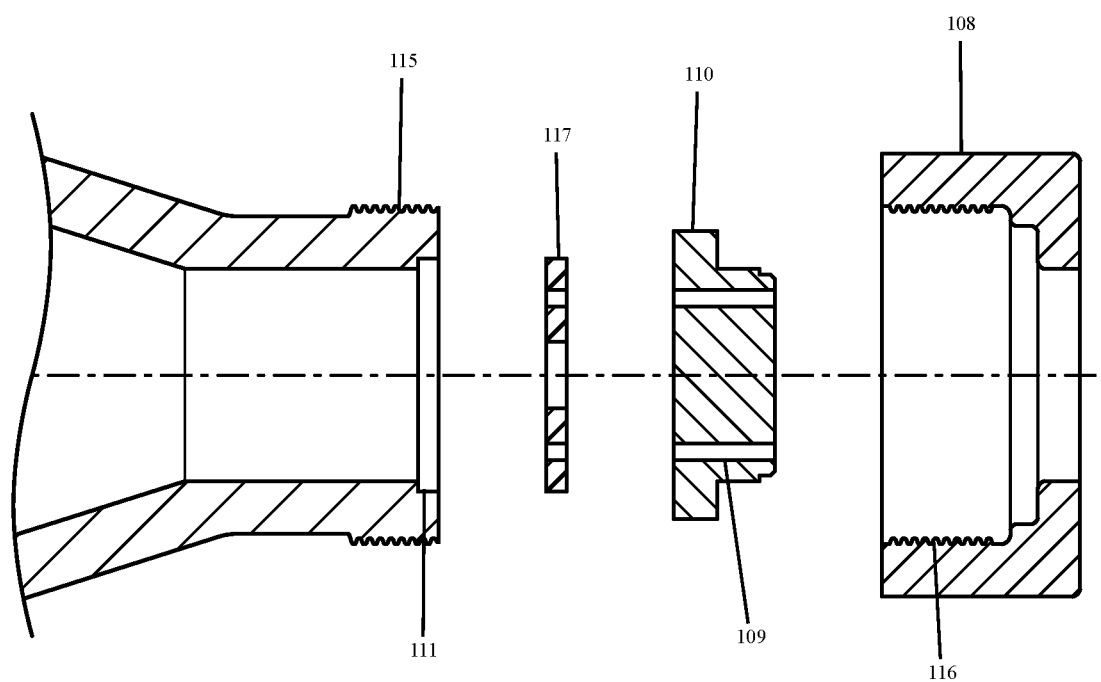
FIG. 1a illustrates an exploded view of the closure mechanism for an end of the vessel.

FIG. 1a illustrates an exploded view of the closure mechanism for an end of the vessel 100. The end of the vessel 100 has external threading 115 that is complementary to internal threading 116 on the cap ring 108. The gasket 117 is adapted to sit within the inset groove 111 within the end of the reaction chamber 101. A plug 110 with two ports 109 sits within and atop the gasket 117 and inset groove 111 of the reaction chamber 101. The cap ring 108 is adapted to fit atop the other closure mechanisms and screw on to the complementary external threading 115 on the end of the vessel 100.

FIG. 2 illustrates a cross-sectional view of the vessel 100 from the approximate center of the vessel 100. The water jacket 102 surrounds the reaction chamber 101, with the water jacket 102 having a hollow jacket core 103 through which liquid may flow. As the vessel is closed in this embodiment, the gasket 117 may be seen sitting within the inset groove (not clearly shown) and the plug 110 seals the end opening of the reaction chamber 101.

FIG. 3 illustrates an orthogonal sectional view of a machined round bar 300 prior to being welded with another machined round bar (not shown) to form the reaction chamber of the extraction vessel 100. In this embodiment, the end portion has ACME threading 115 machined on the outside of the round bar 300 and an inset groove 111 ready to receive a gasket (not shown) on the inside of the round bar 300. The tapered end 107 has a desired taper end diameter 114, and the untampered reaction chamber portion 302 has a desired reaction chamber diameter 113 closer to the beveled connection point 301. The edge of the round bar is beveled 301 in preparation for welding this portion with an identical or nearly identical other portion of the reaction chamber (not shown).

While the extraction pressure vessel and methods of manufacture and use have been described above in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. The scope of the present disclosure is determined by the claims that follow.

What is claimed is:

1. An extraction vessel comprising:
a reaction chamber with external threading on at least one end and at least one end having at least one inset groove;
a water jacket affixed to the reaction chamber capable of separate pressurization and temperature maintenance; and,
at least one closure mechanism on at least one end of the reaction chamber, the closure mechanism comprising a gasket, a plug with at least one port, and a cap ring with internal threading.

2. The extraction vessel of claim 1 wherein the internal and external threading is ACME threading.

3. The extraction vessel of claim 2 wherein the closure mechanism may be sealed by hand closure.

4. The extraction vessel of claim 3 wherein the closure mechanism, external threading, and inset grooves are present on both ends of the reaction chamber.

5. The extraction vessel of claim 1 wherein a sampling mechanism may be affixed to an end of the vessel to allow sampling of a desired product during an extraction run time.

6. The extraction vessel of claim 1 wherein the ports include a mesh filter overlay.

7. A method of extracting compounds from organic matter comprising:
inserting a desired amount of organic matter into a reaction chamber of an extraction vessel with two ends, the ends having ACME threading and an inset groove;
sealing the extraction vessel by disposing a gasket within the inset grooves, disposing a plug atop the gasket on both ends, and tightening a cap ring along complementary ACME threading by hand closure;
pressurizing a solvent to a supercritical state;
pressurizing a water jacket at a lower pressure than the reaction chamber of the extraction vessel;
introducing liquid into the water jacket at a lower temperature than the reaction chamber of the extraction vessel, the water jacket having an inlet and an outlet for continuous flow and temperature maintenance;
passing the solvent through the organic matter for a preferred run time to promote separation of a desired product from the organic matter;
expelling any remaining solvent from the reaction chamber;
opening the extraction vessel by removing the cap ring, plug, and gasket; and,
plunging the desired product from the reaction chamber.

8. The method of claim 7 wherein a user may affix a sampling mechanism to the closure mechanism to allow removal of a sample of the desired product during the run time.

9. The method of claim 7 wherein the solvent is carbon dioxide.

10. A method of manufacturing a high-pressure extraction vessel comprising:
providing two round bars;
machining each round bar to achieve an end with external ACME threads and an inset groove and a hollow core within the round bar with a desired diameter;
beveling the machined round bars at a connection point;
welding together the round bars at the connection point to form a reaction chamber;
welding a water jacket to an outside surface of the reaction chamber to achieve a desired jacket core diameter, the water jacket comprising a hollow sheath with an inlet and an outlet to allow for liquid to flow through;
providing a top and a bottom plug, the plugs machined from solid stainless steel bars; and,
providing a top and bottom cap ring, the cap rings machined from solid carbon steel bars.

11. The method of claim 10 wherein the round bars are of stainless steel.

12. The method of claim 10 wherein the machining is accomplished using computer numerical control technology with multi axis lathe.

13. The method of claim 10 wherein the welding is completed using gas tungsten arc welding.

* * * * *